US007677111B2

(12) United States Patent
Ryser et al.

(10) Patent No.: US 7,677,111 B2
(45) Date of Patent: Mar. 16, 2010

(54) PORTABLE TEST LEVER FOR TESTING A TRACTIVE CAPACITY AND/OR AN ACCELERATION BEHAVIOR OF A CABLE-OPERATED LIFT

(75) Inventors: Hans Ryser, Berlin (DE); Martin Fiedler, Leipzig (DE)

(73) Assignee: TÜV Rheinland Industrie Services GmbH, Köln (DE)

( * ) Notice: Subject to any disclaimer, the term of this patent is extended or adjusted under 35 U.S.C. 154(b) by 610 days.

(21) Appl. No.: 10/558,070

(22) PCT Filed: May 14, 2004

(86) PCT No.: PCT/EP2004/005180

§ 371 (c)(1),
(2), (4) Date: Sep. 5, 2006

(87) PCT Pub. No.: WO2004/103880

PCT Pub. Date: Dec. 2, 2004

(65) Prior Publication Data

US 2007/0012824 A1 Jan. 18, 2007

(30) Foreign Application Priority Data

May 22, 2003 (DE) ................................ 103 23 175

(51) Int. Cl.
*G01N 3/02* (2006.01)

(52) U.S. Cl. .............................. 73/856; 73/760; 73/782

(58) Field of Classification Search ................... 73/782, 73/865.9

See application file for complete search history.

(56) References Cited

U.S. PATENT DOCUMENTS

| | | | | |
|---|---|---|---|---|
| 5,033,563 | A * | 7/1991 | Brainerd et al. | 177/132 |
| 5,522,480 | A * | 6/1996 | Hofmann | 187/391 |
| 6,216,535 | B1 * | 4/2001 | Schapmire | 73/379.08 |
| 6,378,148 | B1 * | 4/2002 | Votel | 5/81.1 HS |
| 6,752,224 | B2 * | 6/2004 | Hopper et al. | 180/22 |
| 7,022,921 | B2 * | 4/2006 | Petrotto | 177/144 |
| 7,354,382 | B1 * | 4/2008 | Warren, II | 482/68 |
| 7,381,163 | B2 * | 6/2008 | Gordon et al. | 482/69 |
| 2004/0148699 | A1 * | 8/2004 | Fernie et al. | 5/86.1 |
| 2004/0217078 | A1 * | 11/2004 | Keane et al. | 212/71 |
| 2004/0238230 | A1 * | 12/2004 | Petrotto | 177/144 |
| 2005/0097670 | A1 * | 5/2005 | Hawk et al. | 5/84.1 |
| 2005/0217024 | A1 * | 10/2005 | Aarestad | 5/86.1 |
| 2006/0260502 | A1 * | 11/2006 | Hjort | 104/93 |
| 2007/0006381 | A1 * | 1/2007 | Tally | 5/86.1 |
| 2008/0271547 | A1 * | 11/2008 | Ryser et al. | 73/865.9 |

FOREIGN PATENT DOCUMENTS

| | | |
|---|---|---|
| DE | 4311011 A | 1/1994 |
| WO | WO 92/08665 A | 5/1992 |

* cited by examiner

*Primary Examiner*—Lisa M Caputo
*Assistant Examiner*—Freddie Kirkland, III
(74) *Attorney, Agent, or Firm*—Venable LLP; Robert Kinberg; Ryan M. Flandro

(57) ABSTRACT

A portable test lever including a load arm and a force arm for efficient examination of the tractive capacity and/or an acceleration capacity of a lift. The test lever includes an integrated measuring value sensor, at least one cable receptacle arranged on the load arm and at a distance from the force arm, and a support. A method used to measure the tractive capacity of a lift cable and/or the acceleration capacity of a lift.

20 Claims, 6 Drawing Sheets

PORTABLE TEST LEVER FOR TESTING A TRACTIVE CAPACITY AND/OR AN ACCELERATION BEHAVIOR OF A CABLE-OPERATED LIFT

CROSS-REFERENCE TO RELATED APPLICATIONS

This application is a National Stage Application of International Application No. PCT/EP04/005180, filed May 14, 2004, which claims the benefit of German Patent Application No. 103 23 175.7, filed May 22, 2003.

BACKGROUND OF THE INVENTION

1. Field of the Invention

The present invention relates to a portable test lever, comprising a load arm and a force arm, as well as to an associated method for detecting the state of a lift, for example within the framework of a safety inspection.

2. Related Art

References EP 0 391 174 B2, EP 0 573 432 B1, as well as EP 0 390 972 B1 respectively disclose a testing device for checking an operating state of the lift by exerting a force via the cable onto the testing device. A conclusion concerning the operating state of the lift can be drawn based on the measuring values detected as a result of the force effective via the cable.

SUMMARY OF THE INVENTION

It is the object of the present invention to simplify a device and a method for checking an operating state of the lift.

The present invention relates to a portable test lever, comprising a load arm and a force arm for testing a tractive capacity, in particular the slip of a cable and/or a lift acceleration capacity. The test lever is provided with an integrated measuring value sensor. A receptacle, in particular a cable receptacle and/or a fastening device, in particular a cable fastening device, is arranged at a distance to the force arm on the test lever. The test lever furthermore comprises a support, preferably in the form of a fixed-point which is advantageously arranged on the test lever between the cable receptacle and the measuring value sensor. The support for the fastening device, in particular for the cable fastening device, is arranged between the fixed point and the material deformation sensor. The portable test lever allows a single individual to transport the test lever from lift to lift and use it without problems. In particular, the use of the portable test lever eliminates the need to have several persons for carrying out a safety inspection.

The portable test lever in particular makes use of the principle that a test force is introduced into the cable via the test lever. As a result, the test lever can have a compact design and can be used as a testing device for all different types of cable-operated lifts.

According to one embodiment, the spacing between the cable receptacle and the fixed-point arranged on the test lever is adjusted, or is preferably adjustable, for a defined parameter measuring. Owing to a defined separation of the test lever into the load arm and the force arm, the force is introduced into the load arm and, by utilizing the fixed-point arrangement as fixing and/or rotating point during the measuring operation, the force is transferred to the load arm and from there to the cable. By utilizing the behavior of the test lever and/or the cable and based on the defined spacing, it is possible to make an evaluation as to whether the driving force on the cable lift is still within the tolerance range or is outside of this range.

The measuring value sensor is advantageously arranged in the force arm and/or the load arm, wherein several such elements can also be provided, especially at different locations.

The test lever in particular allows checking individual cables for the lift. If a plurality of lift cables exist, it is advantageous to check the cable which appears to have the most slack.

The measuring value sensor can detect the force, exerted onto the load arm, by means of at least one suitable measuring parameter, for example by detecting the bending of a force arm subjected to the test force. When using one or several strain gauges, for example, it is possible to determine whether or not a cable will slip when subjected to a definable test force.

In addition or instead, the force can also be measured with the aid of a capacitive sensor, an inductive sensor, a cross-anchor sensor, a magneto-elastic sensor, a piezo-electric sensor, a photo-electric sensor, a resistance linear detector and/or by means of a Hall probe.

When using strain gauges, in particular semiconductor strain gauges, a Wheatstone bridge is preferably used to eliminate an interfering variable such as the temperature.

The measuring value sensor preferably comprises an interference suppressor. For example, these interference variables can include the temperature, electromagnetic interference fields, or the like.

The cable receptacle on the test lever is preferably arranged at one end of the load arm. The load arm can be forked, for example, with the lift cable arranged in the center of the fork. The lift cable in the cable receptacle can be clamped into a cable-fastening device, in particular, thus making it possible to transfer the force from the test lever to the cable. A screw connection, for example, can be used for the clamping. By tightening one or several screws, the lift cable can be pressed into a guide that is arranged between support surfaces.

The fixed point on the portable test lever, for example the cable fastening device, is arranged in particular between the load arm and the force arm. The fixed point arrangement, in particular the cable fastening device, ensures that the test lever can transfer its force to the cable if a test force is effective. The test lever in connection with the fixed point arrangement provides the option of forming a fixed point, for example on an immovable building component or a stationary lift component, by means of which the test lever can develop its lever effect.

The test lever of a different embodiment comprises at least one acceleration sensor. The acceleration sensor can detect, for example, a vertical acceleration and/or a horizontal acceleration of the lift. In addition, it also allows reaching a conclusion concerning the start-up behavior as well as the braking behavior of the lift. The test lever is preferably provided with one or several acceleration sensors in connection with the same measuring value detector, for one or several force measuring sensors and in particular strain gauges. For example, the strain gauges can be positioned in a hollow space inside the test lever and can be connected to a board on which the acceleration sensor is mounted.

According to one modification, the test lever is provided with an integrated evaluation unit in connection with a signaling device. A predetermined parameter profile can advantageously be input and in particular stored in the evaluation unit. The measuring parameter or parameters detected by the test lever can be compared to the predetermined parameters. For example, it is possible to check whether the measuring parameters are located within or outside of a predetermined range. As a result of the connection between the evaluation unit and the signaling device, the state of the lift can be displayed directly on the test lever by triggering a display. For example, the display can show whether the recorded measuring parameters are within or outside of a safety range, thereby avoiding a long and involved evaluation of the recorded measuring parameters. The portable test lever can be used directly for checking and determining the operating state of the cable lift.

The test result is displayed immediately after the test force is exerted.

According to a different modification, the test lever comprises a signal transmitting device, which permits a wireless signal transmission to a computer at a separate location. For example, the test lever can be provided with a storage unit. The detected as well as the stored measuring parameters can be transmitted via the signal transmitting device to the computer at a separate location. This computer can be a laptop, for example provided with an evaluation program. A lift inspector can also use this setup to move the portable test lever along with the lift, but separately from the inspector, and still be able to record and evaluate measuring parameters directly, which is desirable, in particular for an acceleration test.

The computer, arranged at a different location, can furthermore be a computer that controls and/or regulates a building. The signal transmitting device also allows conducting a remote safety test of the cable lift. The recorded and transmitted signals make it possible to draw a conclusion concerning the necessity of a safety testing of the cable lift. In this way, regular testing is possible without the inspector actually having to be permanently on location.

The test lever preferably contains an integrated, replaceable energy supply. The energy supply can be secured, for example by means of one or several batteries and/or storage units and/or an external voltage supply. For this, the test lever is preferably designed to be hollow, at least in a partial region. One or several batteries and/or storage units in particular can be inserted into this hollow section. In addition, the signal transmitting device can at least in part be arranged in this hollow section, along with the measuring value sensor. The test lever can furthermore be provided with a connection for an external voltage supply.

According to a different inventive idea, a method is provided for measuring a tractive capacity, in particular a lift cable slip and/or a lift acceleration capacity by using the following steps:

Fastening of a portable test lever, comprising a load arm and a force arm as well as an integrated measuring value sensor with the aid of a receptacle positioned at a distance to the load arm, in particular a cable receptacle and/or a fastening device and especially a cable fastening device, wherein the test lever is preferably fastened on the lift cable and a fixed point is generated;

Exerting a test force onto a portion of the test lever; and

Recording a measuring parameter which characterizes a state of the lift.

According to this method, the test lever can be arranged stationary on the lift. For example, the test lever can move along with the lift as a result of being arranged on the lift cable or a portion of the lift cabin, thus making it possible to obtain a negative as well as a positive acceleration measurement.

The test lever is attached, for example, with its fixed-point arrangement to a component of the building and/or the lift in order to form a pivotal point. The test force can then be introduced via the test lever into the cable. A slipping of the lift cable can then be detected and measured directly, for example optically or electrically, or in a different manner. The test lever can furthermore also detect a movement of the lift cable.

Within the framework of the safety inspection, the test lever in particular offers the option of evaluating the measuring parameter or parameters in the test lever itself and to display the result on the test lever by triggering a signal. The measuring parameter or parameters are preferably displayed qualitatively, wherein the test lever can be provided for this with at least a first and a second display area. The first display area lights up red, for example, if the evaluation shows that the lift state is outside of the safety range while the second display area lights up green if the evaluation shows that the lift state is within the safety range.

According to one embodiment, the test lever is provided with one or several display means, in particular LEDs, which display a signal generated on the basis of the evaluation. A different embodiment provides for a quantitative display, for example by means of a digital display.

A further modification provides for an acoustic display on the test lever, for example by triggering a warning signal if an insufficient test force is applied. The result of an evaluation of the parameter or parameters can also be transmitted acoustically by generating, for example, different acoustic signals According to a different idea behind the invention, the test lever is arranged on a lift cable in such a way that a fixed point for the test lever is formed through a connection to a building component and/or a lift component. For this, the test lever can be provided with one or several structural components which lead to a fixed point arrangement. The fixed point arrangement, for example, forms the pivoting and/or rotational point for the test lever.

According to a different inventive idea, a test lever is arranged, preferably with a nearly horizontal alignment, in a lift area that moves, wherein the test lever is advantageously attached by means of the load arm. In turn, one or several sensing devices are preferably arranged in the force arm, in particular acceleration sensors. Owing to its horizontal alignment, for example, the test lever can function as fixed octopus arm. During the acceleration of the test lever as a result of a lift movement, the measuring sensors are excited and trigger a measuring signal characterizing the acceleration. Owing to the fact that the sensors are mounted at a distance to the fixed point for the octopus arm, a more sensitive acceleration measurement is obtained as compared to a measurement obtained with a measuring sensor that is attached directly to the moving component of the lift.

According to yet another inventive idea, a test lever is arranged with nearly vertical alignment in a movable region of the lift, which is particularly advantageous in cases where the lift shaft is extremely narrow. For example, an arrangement of this type makes it possible to connect the test lever so-to-speak stationary with the lift, thus permitting a continued testing of the acceleration behavior of the lift. In that case, an additional new test lever is not needed for testing the cable behavior of a lift cable. Rather, the locally installed test lever can be used as described in the above, for example for testing the tractive capacity and for checking the slipping of the lift cable or cables.

A cable-fastening device for a test lever is advantageously used for increasing the measuring accuracy. This cable fastening device has a centrally arranged guide for the lift cable, which is designed to generate a direct force transmission, preferably without generating a torque, thus avoiding a faulty measurement. A centrally arranged guide can be configured, for example, with the aid of planes arranged at an angle to each other and converging toward each other, against which the cable is pressed. In particular, the cable fastening device should be portable.

The test lever preferably is composed primarily of a metal. However, it can also be composed of a glass-fiber reinforced plastic or a similar material, for example, which meets the respective strength requirements, wherein the test lever for one embodiment is made of aluminum. The test lever of a different embodiment is composed of one or several materials. The test lever preferably has a weight of less than four kilograms, which makes it possible to carry the test lever in one hand, support it on the lift cable, and fasten it with the other hand.

The test lever preferably consists of several structural components which advantageously fit one into the other. According to a first embodiment, for example, the length ratio of force arm to load arm can be changed. In addition, the force arm can comprise a test head, arranged so as to be replaceable. A different embodiment provides for the measuring sensors to be arranged in the test lever in such a way that they can be replaced. The evaluation unit and/or a storage unit of yet another embodiment can also be replaced. The test lever is preferably designed such that the software inside the test lever can be adapted. For example, the test lever can be provided with an interface for installing new software or upgrades. The test lever can furthermore have an interface for transmitting signals that must be evaluated or which have been evaluated. For example, the test lever can be provided with an integrated antenna for a radio transmission.

According to a different modification, a cable fastening device for the test lever is provided with an extension. The extension makes possible an engagement of the test lever with its receiving element while it is simultaneously supported on the cable fastening device. The cable fastening device preferably serves as a pivoting axis in cooperation with the fixed-point arrangement of the test lever. When the test lever is admitted with the test force, the test lever rests on the fastening device. One end of the extension into which the test lever engages functions to counter the test force. The test force can thus be transmitted to the cable while simultaneously a counterforce is generated with the aid of the extension.

A further embodiment provides for a replaceable test head on the test lever, wherein this test head is preferably fitted on. In particular, the test head is designed as lever head component, which also comprises the fixed-point arrangement of the test lever. A further modification provides that the test head can be rotated. For example, the test head can be provided with a rotating joint that can be locked in place.

The test lever of a different embodiment is provided with a gudgeon. The gudgeon is inserted, for example, into an opening and preferably into a bore in the driving wheel for the cable lift. By supporting the test lever, for example on the bore, a test force can be exerted onto the test lever to check whether the support cables are slipping.

The test lever is preferably dimensioned such that an effective test force, for example at least 200 kg and preferably up to at least 800 kg, can be transmitted to the cable. The test lever preferably has a lever ratio>1:5, in particular >1:8, and preferably in the range of 1:11 to 1:20. A high effective test force can be introduced in this way via the load arm into the cable by exerting a low test force onto the force arm.

BRIEF DESCRIPTION OF THE DRAWINGS

Advantageous further embodiments and modifications as well as features are explained in further detail in the following drawing. However, the embodiments with the features shown therein are not restricted to the individual features. Rather, these can be combined and can lead to further modifications, in particular having features such as the ones listed in the above description. It is also possible to combine individual features and/or partial regions of the embodiments shown in the following drawing with the above-described features. Shown are in.

DETAILED DESCRIPTION

Figure 1:
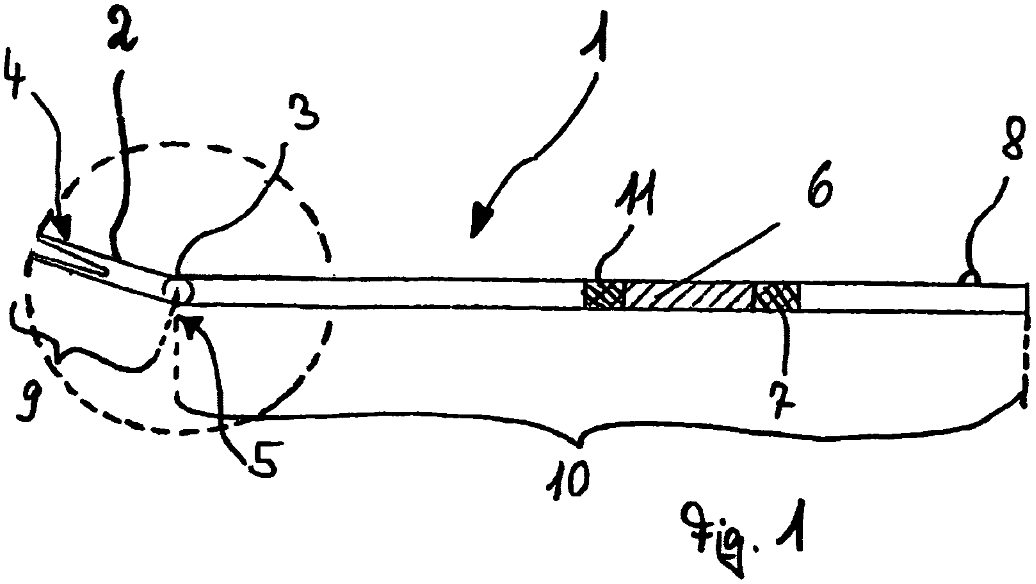
FIG. 1: A first embodiment of a test lever.

FIG. 1 shows a first embodiment of a test lever 1 with a lever head component 2, which is positioned by means of a locking joint 3 on the test lever 1. The lever head component 2 is provided with a cable receptacle 4. The cable receptacle 4 comprises a first and a second leg, between which the lift cable can be inserted. The lift cable can preferably be secured immovably, in particular clamped, in the cable receptacle 4. The test lever 1 comprises the locking joint 3 which is preferably also designed as support 5. The support 5 makes it possible for the test lever 1 to support itself relative to a fixed point and to use this fixed point in particular as rotating and/or pivotal point. It must be considered in this connection that the support 5 preferably is not a point-shaped surface, but rather a supporting surface that extends in longitudinal direction. The lever head component 2, which is arranged on the test lever 1 such that it can pivot by means of the locking joint 3, can thus be moved to different positions to allow the support 5 to be supported. In this way, the test lever 1 can be adapted flexibly to different spatial configurations which an inspector finds on the lift and in particular in the lift shaft. The maximum pivoting circle for the lever head component 2 around the locking joint 3 is indicated with dashed lines. A further modification provides that the lever head component 2 can be optionally pivoted and secured only within a specific angular region, for example in an angular region ranging from 10° to 350°. The test lever 1 is furthermore provided with an integrated measuring value sensor 6. The measuring value sensor 6, in turn, can comprise an integrated evaluation unit 7 that is connected to a signaling device 8. The signaling device 8, for example, comprises one or several indicators, in particular light-emitting diodes. The test lever 1 is designed such that it comprises a first region forming the load arm 9 and a second region forming the force arm 10. The load arm 9 and the force arm 10 are preferably separated by the support 5, as shown. A test force is exerted onto the force arm 10 and is then transmitted via the load arm 9 to the lift cable for determining whether or not a lift driving wheel has a sufficient driving force.

The test lever 1 in particular utilizes the elastic spring characteristics of a test lever 1 material, which form a primary sensing device for the tractive capacity as well as the delay sensor measuring device. In order to measure the tractive capacity, the temporary expansion of the test lever material, caused by a force that is exerted via the lever head component, is preferably measured with the aid of material deformation sensors integrated into the lever material, such as force sensors and strain gauges, and is then electronically evaluated. The test force in particular is generated by manually depressing the test lever 1 on the force arm 10, is then transferred via the load arm 9 to a fixed point on the lift cable. The force, attacking there is preferably detected measuring technologically on the basis of the defined physical characteristics on the test lever 1, in particular the lever regularities which are effective there.

The test lever 1 preferably comprises an integrated acceleration sensor 11. For the delay measurement, it is advantageous if the effect of the mass inertial force is detected, in particular that of the lever head component 2. The test lever is preferably designed as octopus arm. Delay and acceleration forces acting upon the test lever 1 result in a deflection of the test lever 1, which is fixed as compared to the lever head component 2. Since the test lever 1 simultaneously also has a defined mass, it is possible in connection with the mass inertial force to obtain a reading for the acceleration capacity of the lift.

The delay can be measured, for example, during a braking and/or start-up operation of the lift by detecting the temporary expansion generated in the test lever 1 material with the aid of integrated material deformation sensors, for example strain gauges, and by evaluating it as a delay signal. In addition, a different acceleration sensor can be fixedly integrated in the test lever 1, in the form of a reference value detector, which detects a delay with the aid of two axes and transmits this value to the measuring value sensor 6, integrated into the test lever 1 and the evaluation unit 7, which then generates a correlation signal.

The results of the tractive capacity measuring and the delay measuring can be signaled optically and/or acoustically with the signaling device 8, especially if these values fall below or exceed a predetermined limit value.

Figure 2:
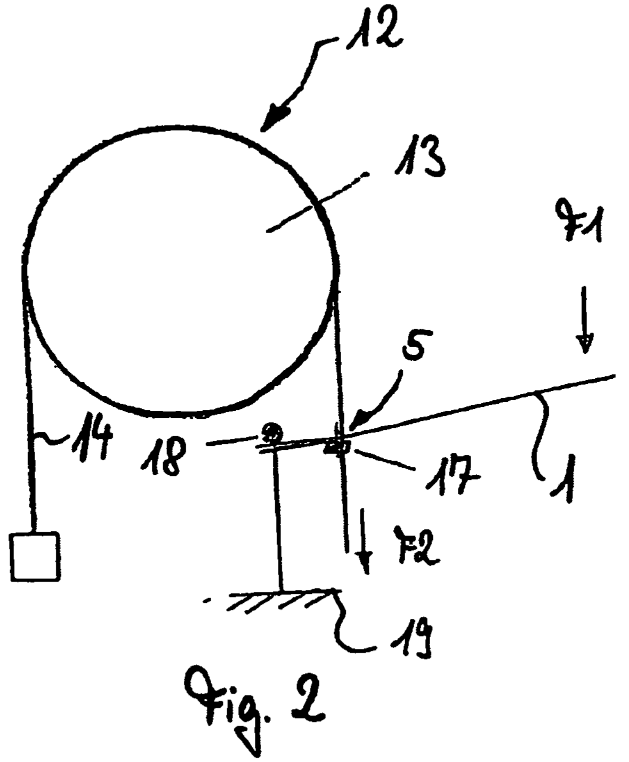
FIG. 2: A use of the test lever according to FIG. 1.

FIG. 2 shows a first option for using the test lever 1 according to FIG. 1. A lift 12 comprises a driving wheel 13 for operating one or several lift cables 14. The test lever 1 supports itself via its support 5 on a cable fastening device 17. The cable fastening device 17 functions to introduce the force into the lift cable 14. The cable fastening device 17 is attached by screwing or clamping it on, for example, wherein the test lever 1 can be arranged on the cable fastening device 17 in such a way that it can pivot on the support 5. An end stop element 18 is furthermore arranged on the lift 12. The end stop element 18 functions to create a fixed point for the lever head component 2 of the test lever 1. The end stop element 18 can be attached, for example, to the driving wheel 13. The driving wheel can be provided with an opening or also with an end stop, which serves as fixed point for the test lever 1. As shown in FIG. 2, the fixed point can also be formed using the end stop element 18 and a building component 19, or by using a fixed lift component. In particular an opening in the ceiling, a machine frame, and/or also a rail holder can be used to form a fixed point. As shown, the end stop element 18 can be arranged at a distance to the building component 19, wherein a cable attached to the building component 19 and provided at one end with the end stop element 18 can be used for this. A force F2 is then transmitted to the lift cable 14 if the test force F1 acts upon the test lever 1. In the process, the transmitted force F2 is generated in dependence on the structurally defined lever ratios and depending on the test force F1.

Figure 3:
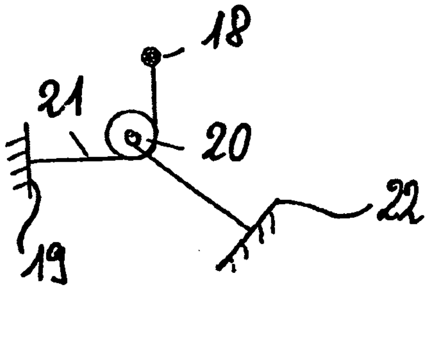
FIG. 3: Forming of a fixed-point arrangement for the test lever.

FIG. 3 shows one option of forming an end stop element 18 by using a guide pulley 20 across which a fastening cable 21 is guided. The fastening cable 21 is attached to a building component 19, for example, and the guide pulley 20 is attached to a lift component 22.

Figure 4:
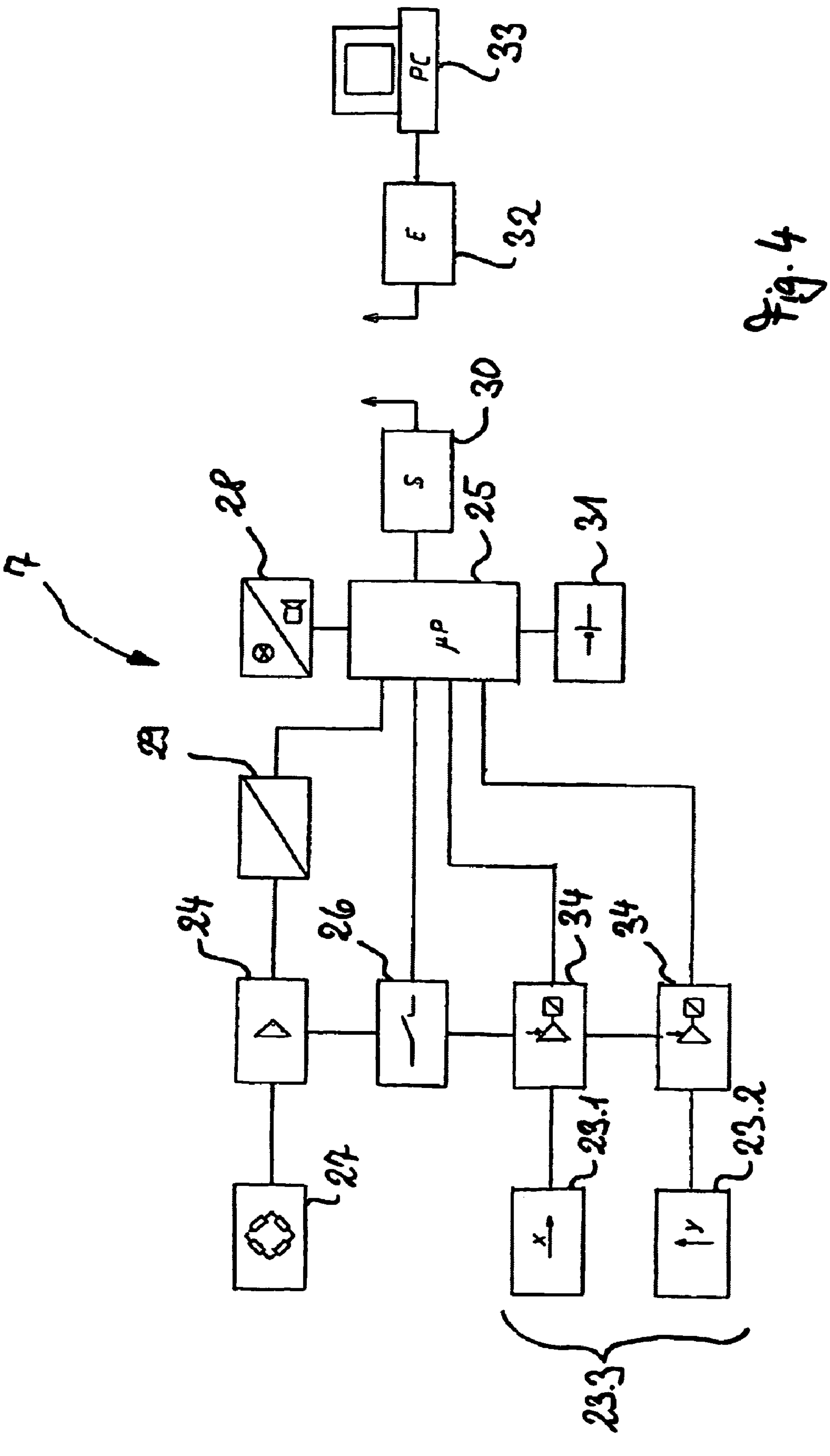
FIG. 4: An electronic evaluation unit which can be integrated into a test lever.

FIG. 4 illustrates an example of an electronic evaluation unit 7 which can be integrated into a test lever. The test lever is configured, for example, with the following integrated elements: a first acceleration sensor 23.1, a second acceleration sensor 23.2, a respective amplifier 24, a computer and control unit 25, a range selection switch 26, a material deformation sensor 27 with thereto connected amplifier 24, a display device 28 for displaying an optical as well as an acoustical signal, for example, an analog/digital converter 29, a signal transmitting device 30, as well as an energy supply 31, for example in the form of a direct-current supply. Additional embodiments of the evaluation unit 7 can comprise one or several of these components in combination with other components. The signal transmitting device 30 is preferably suitable for a radio transmission and is provided with a corresponding transmitting device. A radio-transmission signal is supplied, for example, via a receiver 32 to a computer 33 where a further evaluation can take place.

The tractive capacity is measured, for example, with the aid of the test lever and the following steps: The measuring signal is supplied in the form of a digitized signal via the material deformation sensor 27, the amplifier 24, and a connected analog/digital converter 29 to the computer/control unit 25. The measuring range for the material deformation sensor 27 can be adjusted in this case via the range selection switch 26. The display unit 28 can be used to signal optically and/or acoustically whether the recorded measuring value is within or outside of the preset measuring range. The measuring result is preferably displayed directly on the test lever, either optically and/or acoustically, in the form of a limit value display (correct/not correct). In addition, a radio transmission is possible via the signal transmitting device 30, wherein the signal transmitting device 30 can be activated via the computer and control unit 25, in particular for transmitting a digital, encoded, error-protected data packet that was generated in the computer and control unit 25. The data packet preferably comprises an error protection, and source information in addition to the measuring data. On the one hand, this ensures a sufficient data protection while, on the other hand, this type of encoding permits an unambiguous allocation of the signals, picked up via the compatible receiver 32, which can be decoded again and then evaluated, for example in the computer 33. In particular, it allows a computer 33 to pick up and evaluate a plurality of data packets from different locations. The system advantageously offers itself for a remote testing of lift systems. In addition to the radio transmission, the data packet can also be transmitted to the computer 33 via a telephone network or an electric network.

An acceleration measurement with the test lever is realized, for example, as follows: The exemplary test lever is secured on a lift cage frame for a lift system in such a way that the lever head component forms a freely moving octopus arm. The lever head component with its defined mass detects an acceleration that takes place as mass inertial force, which causes a temporary deformation of the test lever. The temporary deformation is picked up, for example, by one or several material deformation sensors 27. These can be provided, in particular, with an integrated measuring bridge for generating a signal triggered in accordance with the deformation. The measuring range can be preset with the aid of the range selection switch 26. Thus, the signal, supplied via the amplifier 24 to the analog/digital converter 29, is then transmitted to the computer and control unit 25, preferably for forming reference values with the aid of an additional two-coordinate acceleration sensor 23.3. The two-coordinate acceleration sensor 23.3 determines delay values, which are transmitted in the form of digitized signals via a converter stage 34 to the computer and control unit 25. The digitized signals, which are received and rated in the computer and control unit 25, are evaluated, and then transmitted further. For example, an optical as well as an acoustic can be displayed on the display device 28, which indicates whether the recorded measuring value is within or outside of the measuring range, preset with the range selection switch 26.

In the same way as for the tractive capacity measurement, mentioned in the example, the above-described acceleration measurement preferably can also be transmitted in the form of encoded data packets via the signal transmitting device 30, wherein these can be supplied to a receiver 32 in the form of encoded and error-protected data packets. These data packets can also contain digitized measuring data with error protection as well as source information. The data packet preferably contains measuring data concerning the material deformation and the two-coordinate acceleration. According to a further modification, measuring data are transmitted continuously, for example to the computer 33. However, the transmission can also be as requested only, wherein the data can be transmitted via modem or mobile telephone, as well as via a fixed network. The computer 33, in particular, can also have only a supplemental function, wherein the test lever itself is sufficient for the electronic evaluation and display.

Figure 5:
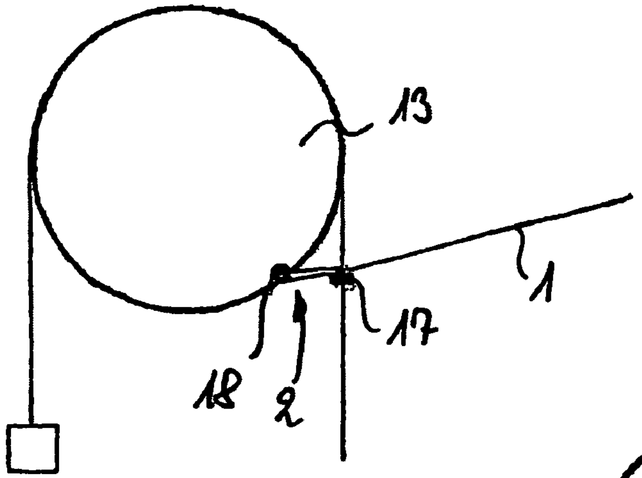
FIG. 5: An optional use of a test lever in cooperation with a driving wheel for a lift.

FIG. 5 illustrates one option for using the test lever 1 in connection with the driving wheel 13. The driving wheel 13 is provided with an end stop element 18, by means of which the test lever 1 can transmit a force onto the cable fastening device 17. The driving wheel 13 can be provided, for example, with one or several bores that are distributed along the circumference. One or several bolts can be inserted into these bores. The test lever 1 is designed at one end in such a way that the lever head component 2 can grip the bolt. If a test force is exerted onto the test lever 1, then the force on the one hand acts upon the cable fastening device 17 while, on the other hand, a counter force acts upon the end stop element 18. According to a further modification, a bolt is provided with a stop yoke into which the lever head component can engage.

Figure 6:
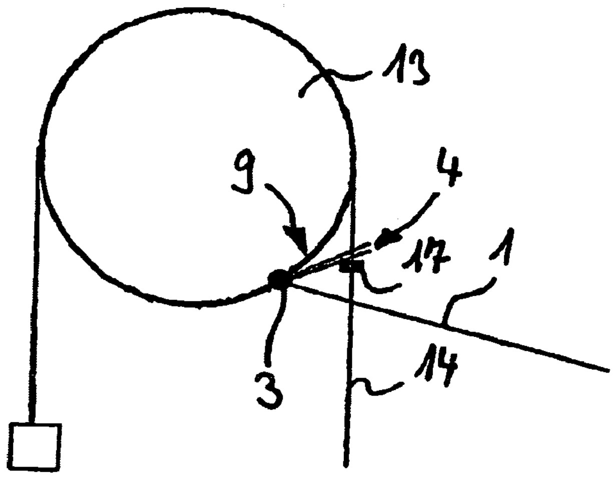
FIG. 6: A different optional use of the test lever with a driving wheel.

FIG. 6 illustrates a different option for using the test lever 1 on the driving wheel 13. For example, it may be necessary to attach the load arm 9 in such a way that it can pivot on the locking joint 3 because of the available space. The test lever 1 is designed such that it can be connected to the driving wheel 13 in the region of the locking joint 3, wherein a bolt connection can again be used for this. The load arm 9 engages with its cable receptacle 4 in the lift cable 14 and supports itself on the cable fastening device 17 when exerting a test force onto the test lever 1.

Figure 7:
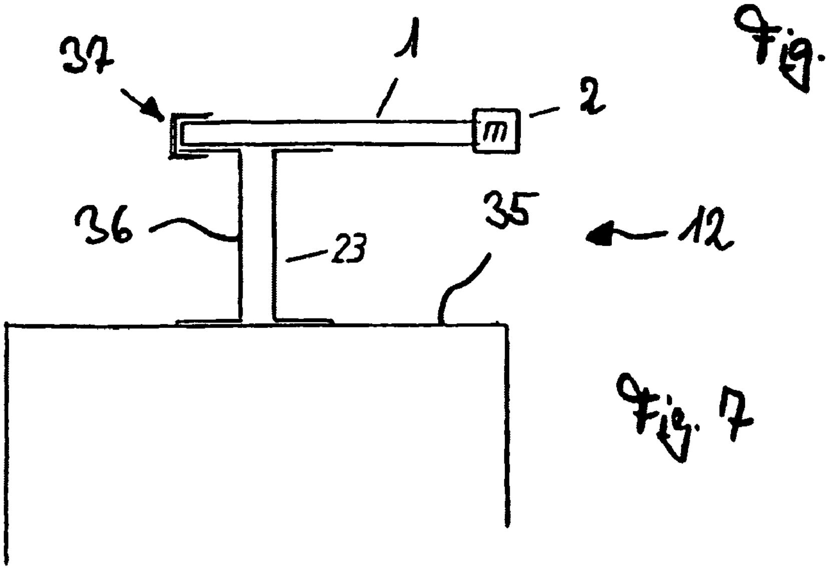
FIG. 7: The fastening of a test lever on a lift.

FIG. 7 shows a test lever 1 that is attached to the lift 12. The lift 12 is provided with a lift cage 35 with thereon arranged cage frame 36. The cage frame 36 is provided with a locking device 37 by means of which the test lever 1 can be secured stationary on the lift cage frame 36 and thus also on the lift cage 35. In that case, the test lever 1 forms a freely moving octopus arm, wherein the lever head component 2 has a defined mass m that is deflected corresponding to the negative or positive acceleration of the lift cage 35, such that it can be measured. In this way, an acceleration measurement can be realized using the test lever 1.

Figure 8:
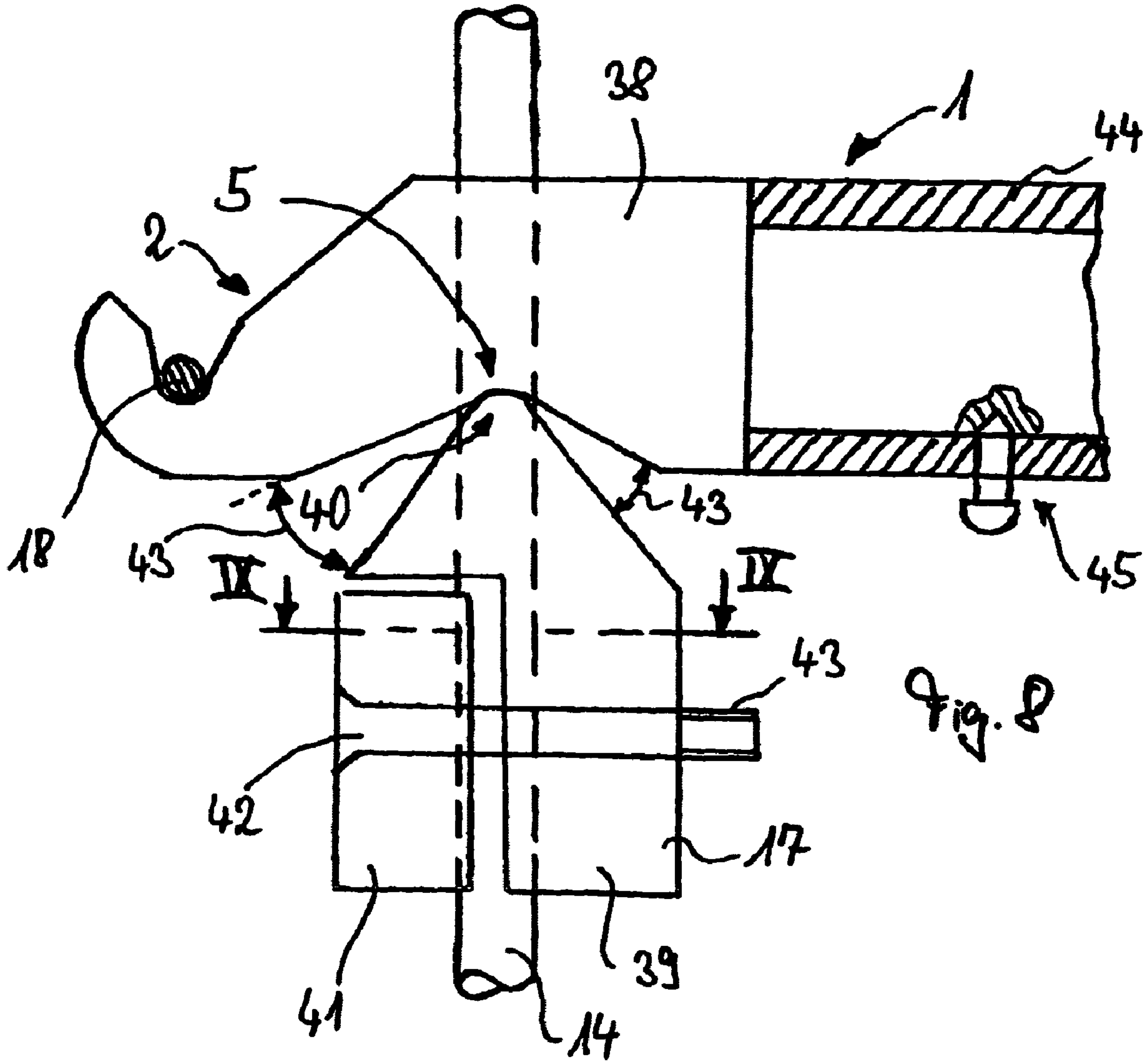
FIG. 8: A different embodiment of the test lever with a test head and a cable-fastening device.

FIG. 8 shows a further embodiment of the test lever comprising a test head 38 and an embodiment of the cable fastening device 17. The cable fastening device 17 has a two-component design, wherein a first component 39 forms a counterpart 40 to the support 5 for the test lever 1. The second component 41 is connected via screws 42 to the first component 39. The screws 42 preferably have a thread 43, so that a non-depicted locking nut can exert a counter force onto the first component 39. The first component 39 and the second component 41 clamp in the lift cable 14. The cable fastening device 17 preferably functions in such a way that the lift cable 14, as shown, is guided through the center of the counterpart 40 and thus the support 5. This arrangement is designed to prevent the transmission of lateral forces into the cable during a force introduction, which could result in a distortion of the measuring result. The fastening device 17 and the test lever 1 are preferably designed to permit some mobility between the counterpart 40 and the support 5. For example, the support 5 and the counterpart 40 are designed with different angles, so that the support 5 can roll off the counterpart 40. The support 5 and/or the counterpart 40 in particular can be designed so as to be at least partially round, to be curved, as well as have a straight surface. The test lever 1 and the cable fastening device 17 are preferably adapted to each other, such that in the center position they form an opening angle 43 that preferably ranges from 10° to 25°, in particular from 12.5° to 17.5°, and which is advantageously 15°. According to a different embodiment, the opening angle 43 is identical on both sides while, according to another embodiment, it is different.

FIG. 8 also shows a test head 38 which forms the lever head component 2. The test head 38 is inserted into a tube 44 where it is held securely by means of a safety device 45, wherein the safety device 45 can be embodied as screw connection. The tube 44 is preferably made of metal. The lever head component 2 is provided with a recess 46 for accommodating an end stop element. The recess 46 can accommodate an end stop element 18 as shown in FIG. 2, FIG. 3, and also in FIG. 5.

Figure 9:
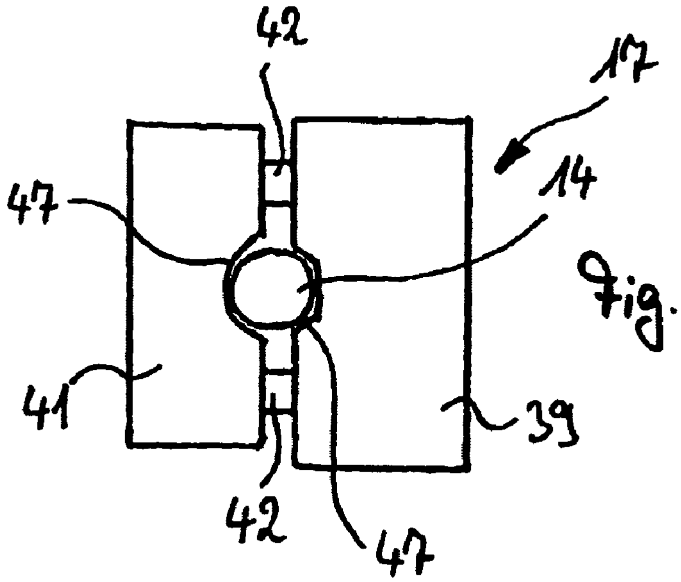
FIG. 9: The cable fastening device in a view from above, as seen along the section IX-IX in FIG. 8.

FIG. 9 shows the cable fastening device 17 in a view from above, along the section IX-IX in FIG. 8. The first component 39 and the second component 41 are screwed together with two screws 42, such that a sufficient clamping force is exerted onto the lift cable 14. For this, the components 39, 41 are provided with pressing surfaces 47. The pressing surface 47 can be curved completely or partially, can be round, or can also have straight sections. In particular, the total pressing surface can be angled, preferably for centering the lift cable 14 in the cable fastening device 17.

Figure 10:
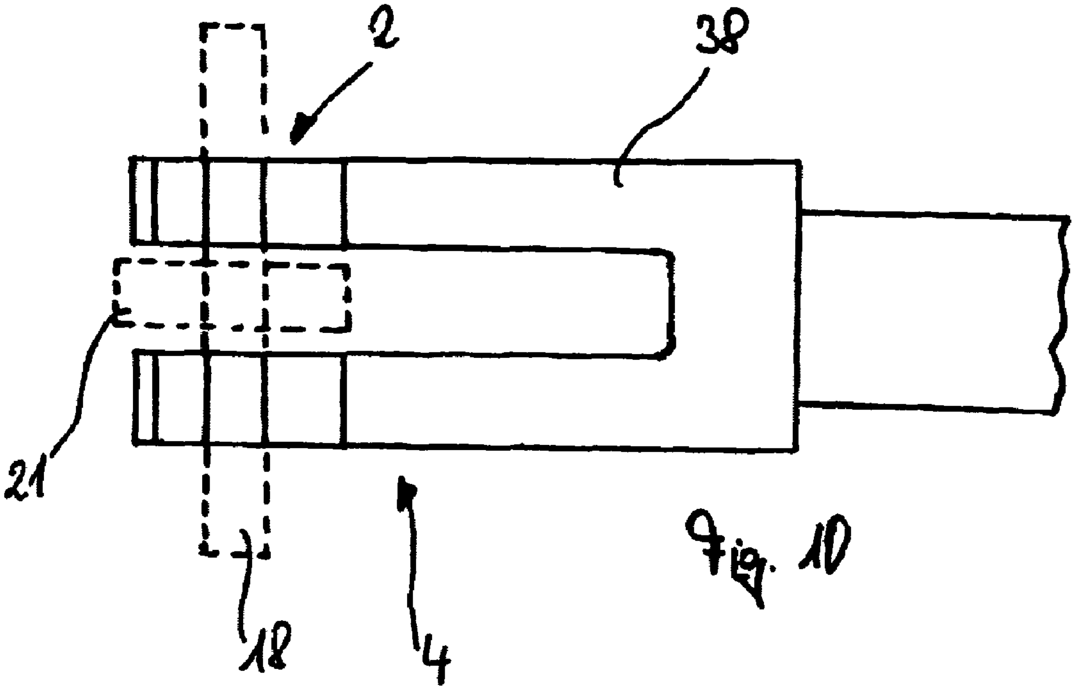
FIG. 10: A test head for a test lever which is designed as lever head component.

The test head 38 according to FIG. 8 is shown in FIG. 10 separate from the tube. The test head 38 is provided with a cable receptacle 4 in the form of two legs positioned at a distance to each other. The lever head component 2 furthermore provides the option of purposely arranging the end stop element 18, which is indicated with dashed lines. A fastening cable 21 can additionally be affixed to the end stop element 18. It is furthermore possible to arrange a portion of the driving wheel between the legs in the test head 38.

Figure 11:
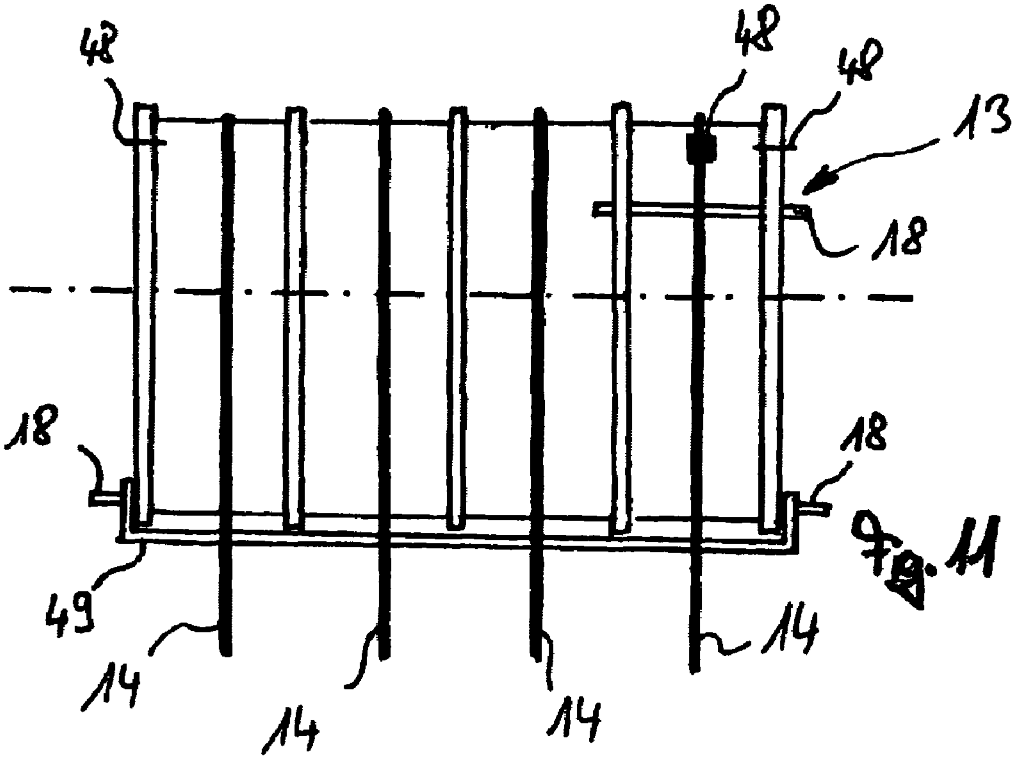
FIG. 11: A schematic view of a driving wheel to which a test lever is attached.

FIG. 11 contains a schematic view of the driving wheel 13, with 4 lift cables 14 extending across the wheel. The driving wheel 13 can be provided with bores, for example, through which a bolt can be guided as end stop element 18. The test lever which is not shown herein can then engage in the end stop element 18. According to a different embodiment, an end stop yoke 49 is provided which extends across the complete width of the driving wheel 13, for example, and is fitted onto the bolts 18. The test head 2 can be secured differently for each support cable 14 of the lift 12 by using the end stop yoke 49. One or several markings 48 can furthermore be provided for detecting a slipping of a lift cable, wherein this can also be detected automatically by using an optical testing device.

Figure 12:
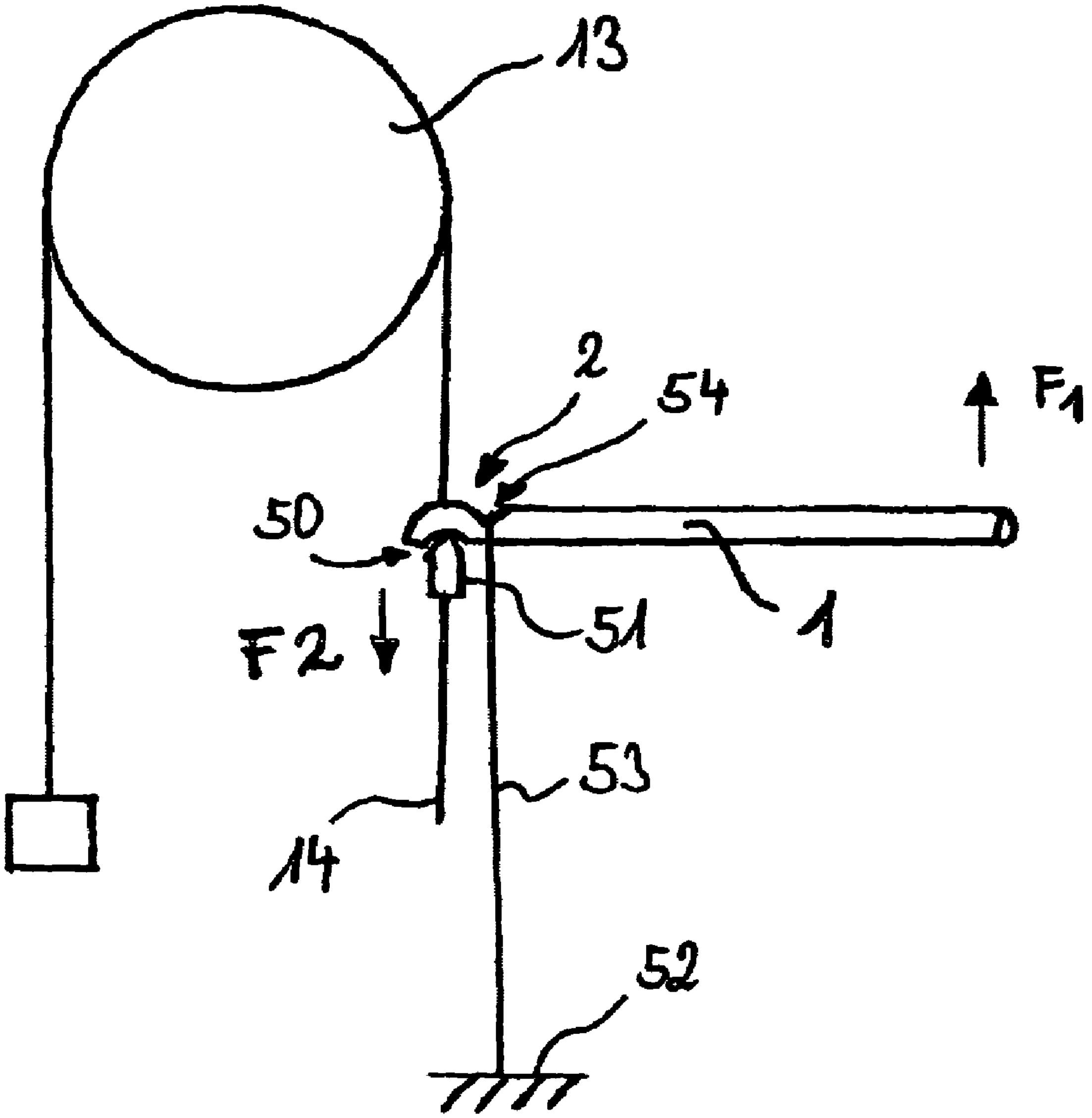
FIG. 12: A principle for an end stop in front of the support cables.

FIG. 12 illustrates a different embodiment for testing the tractive capacity of a lift with the aid of the test lever 1 and together with the driving wheel 13. For example, the test lever 1 can be pivoted around its axis by 180°. The lever head component 2 of the test lever 1 supports itself on a supporting surface 50, wherein the supporting surface 50 takes the form of a fastening element 51 which is attached to the lift cable 14, such that it can be detached again. For this embodiment, a fixed point arrangement is formed by providing a connection 53 for forming a fixed point 54 with the test lever 1, in a region 52 that is fixed relative to the lift cable 14. The region 52 and the connection 53 are preferably selected such that the test lever 1 extends away from the driving wheel 13, relative to the lever head component 2. As shown, the area 52 is preferably arranged relative to the driving wheel 13 in such a way that the test lever does not extend between the lift cable which extends on both sides of the driving wheel 13. By exerting an upward pulling force F1, the corresponding test force F2 is also exerted onto the lift cable 14. This type of arrangement has the advantage, for example, that the inspector carrying out the test does not have to work below the driving wheel 13.

The present invention makes it possible to use accredited or other testing organizations or other authorized offices and personnel for carrying out safety-technical testing operations in connection with safety inspections on lifts and conveying systems or machines which use, for example, positive traction drives, in particular for carrying out repeated tests, design tests, conformity tests and the like.

The invention claimed is:

1. A device for testing a tractive capacity and/or an acceleration behavior of a cable-operated lift, said device comprising:

a portable test lever including:

- a force arm configured to have a test force exerted thereon;
- a load arm coupled to the force arm and including a cable receptacle, wherein the cable receptacle is configured to receive a lift cable;
- an integrated measuring value sensor arranged in at least one of the force arm and the load arm, wherein the integrated measuring value sensor is configured to detect a measuring parameter characterizing an operating state of the lift when the test force is exerted on the force arm and transmitted to the lift cable; and
- a fixed-point arrangement including a support surface separating the load arm and the force arm, wherein the support surface is adapted to pivotably engage with a fixed point end stop related to a building component and/or a second lift component to transfer the test force to the lift cable.

2. The device as defined in claim 1, wherein a spacing between the cable receptacle and the support surface is adjustable.

3. The device as defined in claim 1, wherein the integrated measuring value sensor includes at least one integrated material deformation sensor.

4. The device as defined in claim 3, wherein the integrated material deformation sensor comprises a strain gauge.

5. The device as defined in claim 1, further comprising an integrated acceleration sensor arranged in at least one of the force arm and the load arm.

6. An arrangement including the device as defined in claim 5, wherein the portable test lever is arranged on a movable area of the lift, whereby when the lift moves the integrated acceleration sensor arranged in at least one of the force arm and the load arm detect a measuring signal characterizing the acceleration of the lift.

7. The arrangement as defined in claim 6, wherein the test lever is arranged with a nearly vertical alignment or a nearly horizontal alignment.

8. The device as defined in claim 1, further comprising an integrated electronic evaluation unit in connection with a signaling device, wherein the integrated electronic evaluation unit is coupled to the integrated measuring value sensor arranged in at least one of the force arm and the load arm.

9. The device as defined in claim 8, wherein the electronic evaluation unit includes a stored predetermined parameter profile, whereby the electronic evaluation unit is configured to compare the detected measuring parameter characterizing the operating state of the lift to the predetermined parameter profile to check whether the detected measuring parameter is within a predetermined range.

10. The device as defined in claim 1, further comprising a signal transmitting device arranged in at least one of the force arm and the load arm and configured for a wireless signal transmission to a computer arranged at a separate location.

11. The device as defined in claim 1, further comprising an integrated, replaceable energy supply arranged in at least one of the force arm and the load arm.

12. A method for measuring a tractive capacity of a lift cable and/or an acceleration capacity of a lift, comprising:

- Generating a fixed point for the portable test lever of the device according to claim 1;
- Exerting a test force onto the force arm of the test lever, which is transmitted to the lift cable by the test lever; and
- Detecting a measuring parameter of the test lever which characterizes a state of the lift.

13. The method as defined in claim 12, wherein the portable test lever further comprises an integrated electronic evaluation unit in connection with a signaling device, the integrated electronic evaluation unit being coupled to the integrated measuring value sensor arranged in at least one of the force arm and the load arm, the method further comprising:

- evaluating the measuring parameter in the test lever with the electronic evaluation unit; and
- displaying a result of the evaluating on the signaling device of the test lever.

14. The method as defined in claim 13, wherein the signaling device of the test lever comprises a qualitative display.

15. The method as defined in claim 12, wherein the portable test lever further comprises a signal transmitting device, the method further comprising transmitting a signal including the detected measuring parameter to a computer system at a separate location.

16. An arrangement for testing a tractive capacity and/or an acceleration behavior of a cable-operated lift, including the device as defined in claim 1, wherein an end of the load arm is arranged on a first lift component, and wherein the supporting surface is connected to the fixed point end stop of the building component and/or to the second lift component.

17. The arrangement according to claim 16, wherein the first lift component comprises the lift cable.

18. The device as defined in claim 1, further comprising a cable fastening device configured to be removeably secured to the lift cable, wherein the cable fastening device forms a counterpart for engagement by one of the support surface or a recess defined on the load arm of the portable test lever.

19. The device as defined in claim 18, wherein the other of the of the support surface or the recess defined on the load arm of the portable test lever is configured to engage the fixed point end stop.

20. The device as defined in claim 1, wherein the cable receptacle is defined by first and second legs positioned at a distance from one another.

* * * * *